(12) United States Patent
Ohno (10) Patent No.: US 11,240,161 B2
(45) Date of Patent: Feb. 1, 2022

(54) DATA COMMUNICATION APPARATUS FOR HIGH-SPEED IDENTIFICATION OF ADAPTIVE BIT RATE, COMMUNICATION SYSTEM, DATA COMMUNICATION METHOD, AND PROGRAM

(71) Applicant: NEC CORPORATION, Tokyo (JP)

(72) Inventor: Yuki Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/753,499

(22) PCT Filed: Oct. 4, 2018

(86) PCT No.: PCT/JP2018/037179
§ 371 (c)(1),
(2) Date: Apr. 3, 2020

(87) PCT Pub. No.: WO2019/070020
PCT Pub. Date: Apr. 11, 2019

(65) Prior Publication Data
US 2020/0328980 A1 Oct. 15, 2020

(30) Foreign Application Priority Data
Oct. 6, 2017 (JP) .............................. JP2017-195661

(51) Int. Cl.
*H04L 12/825* (2013.01)
*H04L 29/06* (2006.01)

(52) U.S. Cl.
CPC .......... *H04L 47/25* (2013.01); *H04L 63/0428* (2013.01); *H04L 67/42* (2013.01)

(58) Field of Classification Search
CPC ..... H04L 47/25; H04L 63/0428; H04L 67/42; H04L 47/19; H04L 65/80; H04L 65/608; H04L 65/605
See application file for complete search history.

(56) References Cited

U.S. PATENT DOCUMENTS 6,714,986 B2 * 3/2004 Karibe ............... H04N 7/17336
348/E5.008
7,636,132 B2 12/2009 Sakamoto
(Continued)

FOREIGN PATENT DOCUMENTS

EP    3142368 A1    3/2017
JP    10-233775 A   9/1998
(Continued)

OTHER PUBLICATIONS

"Abstract of HTTP Live Streaming", Apple Inc, Internet search result as of Sep. 7, 2018, <URL:https://developer.apple.com/jp/documentation/StreamingMediaGuide.pdf>.
(Continued)

*Primary Examiner* — Jimmy H Tran
(74) *Attorney, Agent, or Firm* — Sughrue Mion, PLLC (57) ABSTRACT

A data communication apparatus is provided that includes: a transmission-reception part configured to transmit and receive data between a client terminal and a server, an ABR determination part configured to determine whether or not a data transmission scheme from the server to the client terminal is based on an ABR (Adaptive Bit Rate) distribution scheme, and, a scheme determination part configured to determine the data transmission scheme upon transmitting a received data from the server to the client terminal according to a result by the ABR determination part, wherein the transmission-reception part is configured to transmit the received data from the server to the client by the data transmission scheme determined by the scheme determination part.

20 Claims, 7 Drawing Sheets

(56) References Cited

U.S. PATENT DOCUMENTS

| | | | |
|---|---|---|---|
| 9,467,387 B2 | 10/2016 | Phillips et al. | |
| 9,906,458 B2 | 2/2018 | Phillips et al. | |
| 9,961,001 B2 | 5/2018 | Kadaba et al. | |
| 10,044,466 B2 | 8/2018 | Schmidt et al. | |
| 10,506,005 B2 | 12/2019 | McGinnity et al. | |
| 10,523,451 B2* | 12/2019 | Phillips | H04L 65/604 |
| 2004/0243715 A1* | 12/2004 | Yokoyama | H04L 29/06 709/231 |
| 2007/0032198 A1 | 2/2007 | Sakamoto | |
| 2010/0254390 A1* | 10/2010 | Budrikis | H04L 49/103 370/395.1 |
| 2014/0161050 A1* | 6/2014 | Grinshpun | H04N 21/2393 370/329 |
| 2015/0012586 A1* | 1/2015 | Ozawa | H04N 21/23106 709/203 |
| 2016/0080238 A1* | 3/2016 | Bar-Yanai | H04L 43/0894 709/224 |
| 2016/0205164 A1* | 7/2016 | Schmidt | H04N 21/8456 709/219 |
| 2016/0234125 A1* | 8/2016 | Phillips | H04N 21/2402 |
| 2016/0234126 A1* | 8/2016 | Phillips | H04L 65/4084 |
| 2016/0254972 A1* | 9/2016 | Oshiba | H04L 47/822 370/252 |
| 2016/0277299 A1* | 9/2016 | Kadaba | H04L 41/142 |
| 2017/0034735 A1* | 2/2017 | Lee | H04L 47/193 |
| 2017/0078348 A1 | 3/2017 | McGinnity et al. | |
| 2018/0077592 A1* | 3/2018 | Kim | H04L 65/4084 |
| 2018/0109579 A1* | 4/2018 | Salgueiro | H04L 65/607 |
| 2018/0152490 A1* | 5/2018 | Hiruma | H04L 43/0852 |
| 2018/0242882 A1* | 8/2018 | Kiyoshige | H04L 12/28 |
| 2018/0248809 A1* | 8/2018 | Kurosawa | H04L 47/22 |
| 2018/0278708 A1* | 9/2018 | Ishihara | H04L 67/2852 |
| 2018/0288118 A1* | 10/2018 | Bae | H04W 4/06 |
| 2018/0302907 A1* | 10/2018 | Niina | H04W 72/0406 |
| 2018/0323899 A1* | 11/2018 | Choi | H04L 65/608 |
| 2018/0337900 A1* | 11/2018 | Uki | H04L 67/28 |
| 2018/0338264 A1* | 11/2018 | Kim | H04W 28/0236 |
| 2019/0140805 A1* | 5/2019 | Tsuda | H04L 5/0058 |
| 2019/0349713 A1* | 11/2019 | Obara | H04W 4/029 |
| 2020/0053822 A1* | 2/2020 | Kimura | H04W 36/0055 |
| 2021/0160738 A1* | 5/2021 | Miyamoto | H04W 88/06 |

FOREIGN PATENT DOCUMENTS

| | | |
|---|---|---|
| JP | 2004-336730 A | 11/2004 |
| WO | 2016/136215 A1 | 9/2016 |
| WO | 2016/185998 A1 | 11/2016 |
| WO | 2017/098722 A1 | 6/2017 |

OTHER PUBLICATIONS

International Search Report for PCT/JP2018/037179 dated Dec. 11, 2018.

Extended European Search Report dated Sep. 23, 2020 in Application No. 18864670.7.

* cited by examiner

DATA COMMUNICATION APPARATUS FOR HIGH-SPEED IDENTIFICATION OF ADAPTIVE BIT RATE, COMMUNICATION SYSTEM, DATA COMMUNICATION METHOD, AND PROGRAM

CROSS-REFERENCE TO RELATED APPLICATIONS

This application is a National Stage of International Application No. PCT/JP2018/037179 filed Oct. 4, 2020, claiming priority based on Japanese Patent Application No. 2017-195661 filed on Oct. 6, 2017, the disclosures of which are incorporated herein in their entirety by reference.

The present invention relates to a data communication apparatus, communication system, data communication method, and program.

BACKGROUND

In recent years, a content distribution technology called ABR (Adaptive Bit Rate) has been developed. Non-Patent Literature 1 describes HTTP (Hyper Text Transfer Protocol) Live Streaming (HLS) that is an example of ABR distribution scheme. In the content distribution by HLS, a single content is divided into a plurality of segment files, and each of divided segment files is transmitted to a client terminal. Also in HLS, a playlist file(s) that describes URLs (Uniform Resource Locator) of each of segment files in the content in order of reproduction time, the segment files that correspond to a plurality of types of files having different bit rates for the content, and a variant playlist file that describes URLs of the playlist files corresponds to each bit rate are used. The client terminal acquires the variant playlist file and selects a playlist file corresponding to a bit rate suitable for a viewing environment from the playlist files that are described in the files. The client terminal sequentially acquires the segment files described in the selected playlist file and reproduces the content.

Patent Literature (PTL) 1 discloses on a determination whether or not a stream distributed from the server is ABR stream using a temporal pattern(s) (waveforms) of a received data.

Patent Literature 2 discloses a technique for calculating an optimum transmission speed for a transmission of each files upon a plurality of files are divided and transmitted in the file transmission by ABR. The technique addresses a problem that pacing is performed for the individual files in case of ABR communication, however, pacing is not performed for the whole content.

Patent Literature 3 discloses a technique for realizing a traffic control in quick response to a sudden increase or decrease in the traffic. In Patent Literature 3, in order to realize the above items, an increase or decrease trend(s) is calculated from a past information at a traffic measurement time, and utilizes for the traffic control.

Patent Literature 4 discloses a technique in ATM (Asynchronous Transfer Mode) network, for efficient transmission of an ABR cell(s) that is QoS (Quality of Service) class while in a situation of mixed traffics of other QoS class (CBR; Constant Bit Rate/VBR; Variable Bit Rate). In Patent Literature 4, in order to realize the above items, only the ABR cells are extracted, and a dedicated cell buffer for storing the ABR cells is provided.

[PTL 1] US Publication No. 2016/0080238A1
[PTL 2] International Publication No. WO2016/185998A1
[PTL 3] International Publication No. WO2016/136215A1
[PTL 4] Japanese Patent Kokai Publication No.JP-H10-233775A
[NPL 1] Apple Inc, "Abstract of HTTP Live Streaming" [Online], Internet search result as of 7 Sep. 2018. <URL: https://developer.apple.com/jp/documentation/StreamingMediaGuide.pdf>

SUMMARY

Each disclosure of the above-listed Citation List is incorporated herein in its entirety by reference. The following analysis has been made by the inventors.

Patent Literature 1 discloses a determination of ABR stream, however, there is no mention of any concrete method.

In the technology disclosed in Patent Literature 2, it is assumed that all communications performed in a system are ABR communication, and there is no mention on determining whether or not the communication is ABR communication. However, in a case where an apparatus is arranged in a middle of the both end apparatuses as assumed in the system disclosed in Patent Literature 2, communications using other communication systems may co-exist in addition to ABR communication. In a situation where such communication systems co-exist, the technique disclosed in Patent Literature 2 does not function effectively. That is, it is not possible to identify a target communication(s) to which the technology disclosed in Patent Literature 2 is to be applied.

The technique disclosed in Patent Literature 3 is effective based on a premise that a traffic(s) that has appeared in a past does not change, however, is not effective in a case where a new traffic that has not appeared in the past suddenly appears. In particular, in recent years, network traffics are increasing, so that the past increase or decrease trends may not always be applied as they were. As a result, there is a possibility that the traffic control as expected is not realized with the technique disclosed in Patent Literature 3.

The technique disclosed in Patent Literature 4 is based on predetermined QoS class in ATM network. In other words, the technique disclosed in Patent Literature 4 cannot extract the ABR cells in an environment where a plurality of traffic patterns co-exist, and it is not known in advance what communication scheme is used. In particular, in recent years, there are much of communications such as SSL (Secure Sockets Layer) communication whose communicating contents cannot be analyzed from outside, so that it is not realistic to assume that QoS class could be identified in advance.

A main object of the present invention is to provide a data communication apparatus, a communication system, a data communication method, and a program for high-speed identification of an ABR traffic(s) in an environment where a plurality of traffic patterns co-exist.

According to a first aspect of the present invention, there is provided a data communication apparatus, comprising: a transmission-reception part configured to transmit and receive data between a client terminal and a server, an ABR determination part configured to determine whether or not a data transmission scheme from the server to the client terminal is based on an ABR (Adaptive Bit Rate) distribution scheme, and, a scheme determination part configured to determine the data transmission scheme upon transmitting a received data from the server to the client terminal according to a result by the ABR determination part, wherein the transmission-reception part is configured to transmit the received data from the server to the client by the data transmission scheme determined by the scheme determination part.

According to a second aspect of the present invention, there is provided a communication system, comprising: a client terminal, a server, a data communication apparatus configured to relay data between the client terminal and the server, wherein the data communication apparatus comprises: a transmission-reception part configured to transmit and receive data between the client terminal and the server, an ABR determination part configured to determine whether or not a data transmission scheme from the server to the client terminal is based on an ABR (Adaptive Bit Rate) distribution scheme, and, a scheme determination part configured to determine the data transmission scheme upon transmitting a received data from the server to the client terminal according to a result by the ABR determination part, wherein the transmission-reception part is configured to transmit the received data from the server to the client by the data transmission scheme determined by the scheme determination part.

According to a third aspect of the present invention, there is provided a data communication method for a data communication apparatus that comprises a transmission-reception part which transmits and receives data between a client terminal and a server, comprising: ABR determining whether or not a data transmission from the server to the client terminal is based on an ABR (Adaptive Bit Rate) distribution scheme, transmission scheme determining a data transmission scheme upon transmitting a received data from the server to the client terminal according to a result of the ABR determining, and, transmitting the received data from the server to the client by the data transmission scheme determined by the transmission scheme determining.

According to a fourth aspect of the present invention, there is provided a program executed by a computer installed to a data communication apparatus that comprises a transmission-reception part which transmits and receives data between a client terminal and a server, comprising: a process of ABR determining whether or not a data transmission from the server to the client terminal is based on ABR (Adaptive Bit Rate) distribution scheme, a process of transmission scheme determining the data transmission scheme upon transmitting a received data from the server to the client terminal according to a result of the process of ABR determining, a process of transmitting the received data from the server to the client terminal by the data transmission scheme determined by the process of scheme determining. The program may be recorded on a computer readable storage medium. The storage medium may be non-transient such as semiconductor memory, a hard disk, a magnetic recording medium, an optical recording medium or the like. The present invention may be embodied as a computer program product.

According to each aspect of the present invention or disclosure, there are provided a data communication apparatus, a communication system, a data communication method, and a program that contribute to high-speed identification of an ABR traffic(s) in an environment where a plurality of traffic patterns co-exist.

MODES

First, an outline of one exemplary embodiment will be described. The reference symbols of the drawings appended to this outline are added for the sake of convenience to each element as an example for aiding understanding, and the description of the outline is not intended to limit any way. Also, a connection line between blocks in each block diagram includes both bidirectional and unidirectional directions. The unidirectional arrows schematically indicate the flow of main signals (data), and do not exclude bidirectionality.

Figure 1:
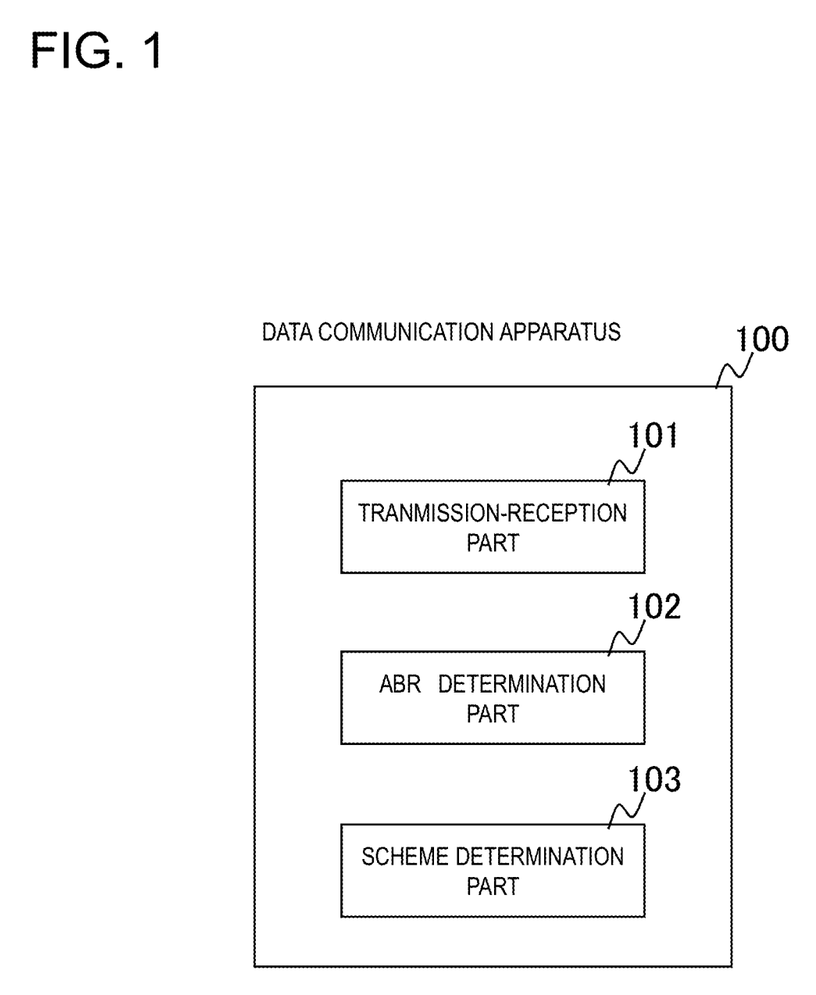
FIG. 1 is a diagram showing an outline of one exemplary embodiment.

A data communication apparatus 100 according to one exemplary embodiment comprises a transmission-reception part 101, an ABR determination part 102, and a scheme determination part 103 (refer to FIG. 1). The transmission-reception part 101 transmits and receives data between a client terminal and a server. The ABR determination part 102 determines whether or not a data transmission scheme from the server to the client terminal is based on an ABR (Adaptive Bit Rate) distribution scheme. The scheme determination part 103 determines the data transmission scheme upon transmitting a received data from the server to the client terminal according to a result by the ABR determining part 102. Further, the transmission-reception part 101 transmits the received data from the server to the client terminal by the data transmission scheme determined by the scheme determination part 103.

The ABR determination part 102 determines whether or not the data transmission scheme from the server is an ABR distribution scheme using a pattern(s) (traffic pattern; feature having ABR traffic) specific to the data transmitted by the ABR distribution scheme. In a case where a result of the determination is that the data transmission scheme is the ABR distribution scheme, the scheme determination part 103 realizes a traffic control(s) suitable for the ABR distribution scheme. At that time, even in a case where the data transmitted from the server to the client terminal is encrypted, it does not affect the patterns having ABR traffic (a plurality of packets or data in a same session transmitted by the ABR distribution scheme), so that it is possible to determine the data distribution scheme. That is, the data communication apparatus 100 utilizes a feature that the traffic pattern of the ABR traffic is determined, it can identify ABR traffic even in a case where the traffic pattern is not known in advance. That is, even in a case where a traffic model is not known in advance, the ABR traffic can be identified, and an optimal traffic control can be performed.

Subsequently, prior to a description of a concrete exemplary embodiment, the ABR traffic targeted in the present disclosure will be described.

Figure 2:
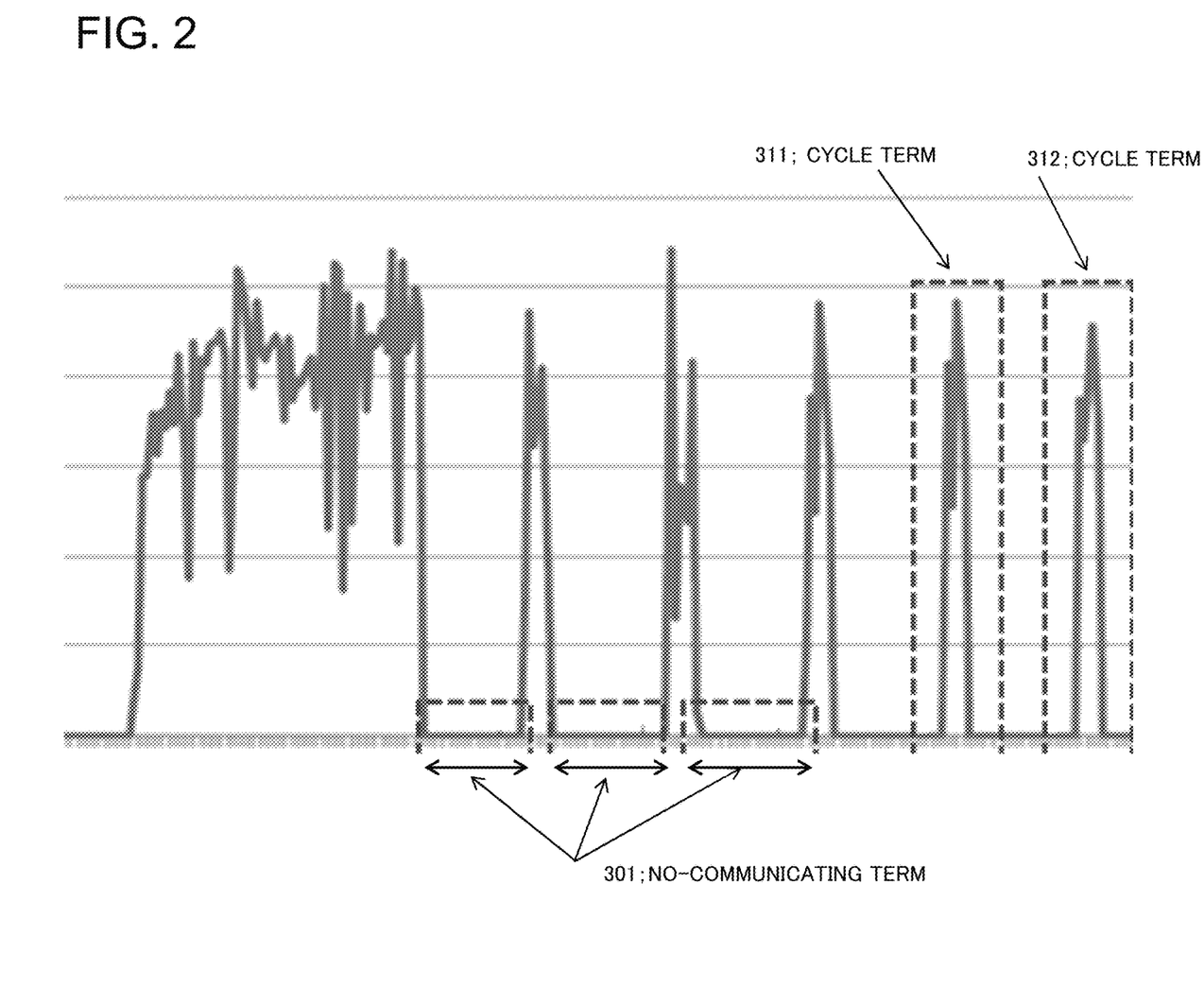
FIG. 2 is an example of schematic diagram showing a waveform(s) related to a received data amount by ABR traffic.

FIG. 2 is an example of schematic diagram of a waveform(s) relating to a received data amount by ABR traffic. By referring to FIG. 2, at least two of following features can be confirmed in the waveforms by ABR traffic.

A first feature is that no-communicating terms periodically exist. In FIG. 2 the no-communicating terms 301 are shown.

A second feature is that, by assuming that a term length (cycle) from a start of the data communicating term to an end of the no-communicating term as one term unit, the received data amount in a cycle subsequent to the cycle in which a large data amount has been received are approximately same. In FIG. 2, it can be seen that a predetermined data amount is received in a cycle 311 and almost the same data amount is received in a subsequent cycle 312.

Further, the terms used in the present disclosure are defined as in Table 1 below.

TABLE 1

| No. | TERM | DESCRIPTION |
| --- | --- | --- |
| 1 | MEASUREMENT TERM UNIT | Time term in which data is measured |
| 2 | MEASUREMENT TERM UNIT LENGTH | Time term length of MESUREMENT TERM UNIT |
| 3 | DATA AMOUNT IN MEASUREMENT TERM UNIT | Data amount received in MESUREMENT TERM UNIT |
| 4 | MINIMUM DATA AMOUNT IN COMMUNICATING TERM UNIT | Amount deemed as minimum data amount transmitted in MEASUREMENT TERM UNIT(Threshold) |
| 5 | DATA COMMUNICATING TERM | MESUREMENT TERM UNITs whose DATA AMOUNT IN MEASUREMENT TERM UNIT is equal or larger than MINUMUM DATA AMOUNT IN COMMUNICATING TERM UNIT |
| 6 | NO-COMMUNICATING TERM | MEASUREMENT TERM UNITs whose DATA AMOUNT IN MEASUREMENT TERM UNIT is smaller than MINUMUM DATA AMOUNT IN COMMUNICATING TERM UNIT |
| 7 | CYCLE TERM | Term from start of DATA COMMUNICATING TERM to end of NO-COMMUNICATING TERM |
| 8 | CYCLE DATA AMOUNT | Sum of DATA AMOUNT IN MEASUREMENT TERM UNIT for COMMUNICATING TERM in a CYCLE TERM, wherein maximum amount is set for CYCLE DATA AMOUNT (defined as MAXIMUM CYCLE DATA AMOUNT) |
| 9 | CYCLE LENGTH | Sum of MEASUREMENT TERM UNIT LENGTH for a CYCLE TERM, wherein upper limit length is set for CYCLE LENGTH (defined as MAXIMUM CYCLE LENGTH) |
| 10 | CYCLE DATA AMOUNT CHANGE RATIO | Change ratio of CYCLE DATA AMOUNT between sequencing CYCLE TERMs, wherein maximum change ratio is set for CHANGE RATIO ( defined as MAXIMUM CYCLE DATA AMOUNT CHANGE RATIO) |
| 11 | CYCLE LENGTH CHANGE RATIO | Change ratio of CYCLE LENGTH between sequencing CYCLE TERMs, wherein upper limit is set for CHANGE RATIO (defined as MAXIMUM CYCLE LENGTH CHANGE RATIO) |

Figure 3:
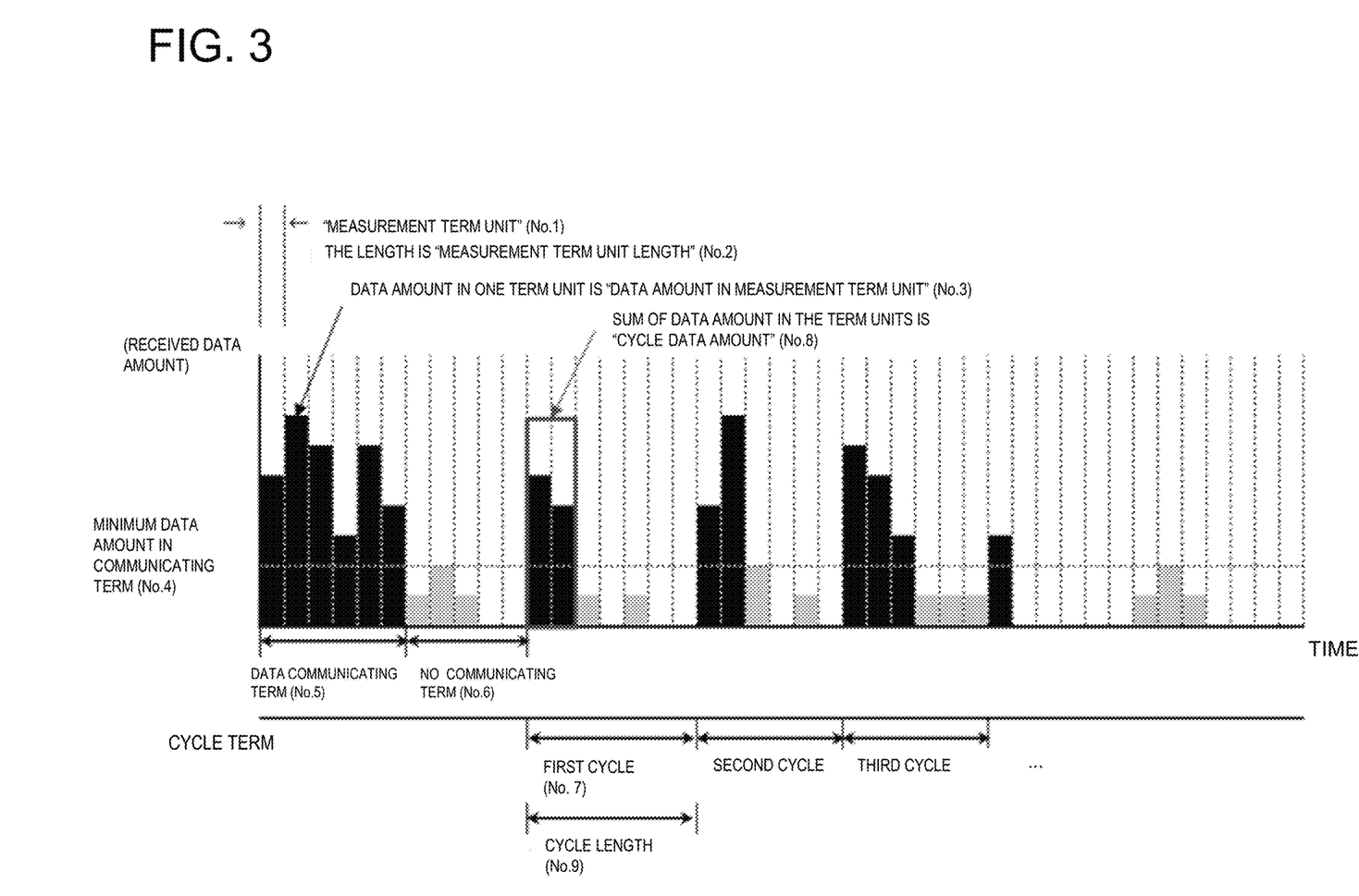
FIG. 3 shows a diagram to illustrate terms used in the present disclosure.

FIG. 3 is a diagram for explaining the terms used in the present disclosure. FIG. 3 shows relationships between the item number (No.) in the above table and the ABR traffic waveforms.

Hereinafter, concrete exemplary embodiments will be described in more detail with reference to the drawings. Note that in each exemplary embodiment, the same components are denoted by the same reference symbols, and the description thereof will be omitted.

First Exemplary Embodiment

A first exemplary embodiment will be described in more detail with reference to the drawings.

[System Configuration]

Figure 4:
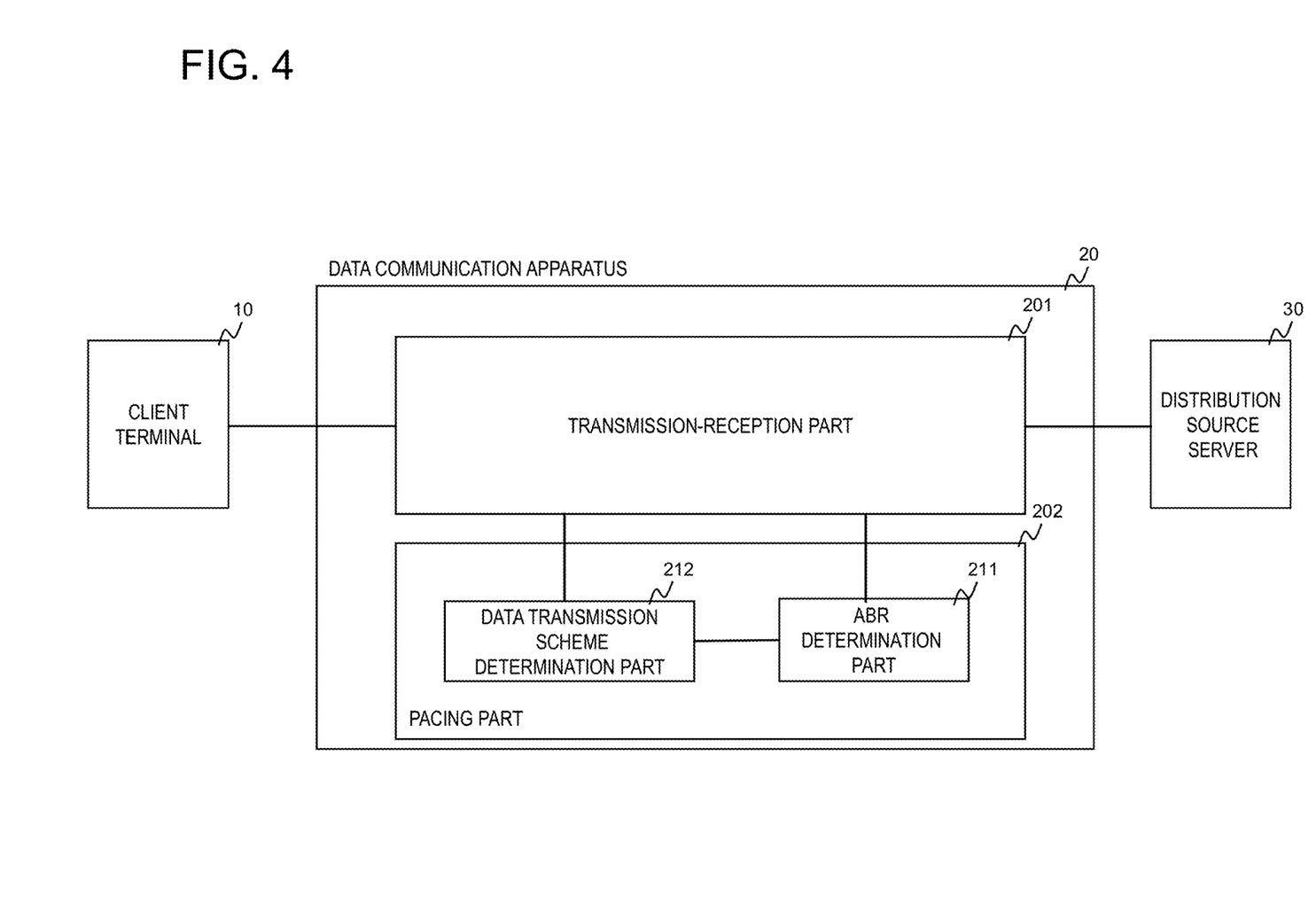
FIG. 4 is a diagram showing an example of a schematic configuration of a communication system according to a first exemplary embodiment.

FIG. 4 is a diagram showing an example of a schematic configuration of a communication system according to the first exemplary embodiment. By referring to FIG. 4, the communication system is configured by comprising a client terminal 10, a data communication apparatus 20, and a distribution source server 30.

The client terminal 10 and the data communication apparatus 20 are connected via a first network (not shown). The first network is typically a wireless network.

The data communication apparatus 20 and the distribution source server 30 are connected via a second network (not shown). The second network is typically a wired network.

Note that the first and second networks are not limited to the wireless network and the wired network. Of course, each apparatus may be connected by a network other than these.

The client terminal 10 is a terminal that supports the ABR distribution such as HLS. The client terminal 10 requests the data transmission to the distribution source server 30. At that time, the client terminal 10 performs encrypted communication with the distribution source server 30 by SSL (Secure Socket Layer) or TLS (Transport Layer Security) (transmits and receives SSL data or TLS data). Here, in the first exemplary embodiment, it is assumed that the communication between the client terminal 10 and the distribution source server 30 is encrypted by SSL.

The client terminal 10 receives the data transmitted as a result of the data transmission request. The client terminal 10 selects a bit rate of the content to be received based on a playlist file(s) (for example, a playlist file(s), a variant playlist file based on HLS) distributed from the distribution source server 30. The terminal 10 acquires a divided file(s) (TS files based on HLS) according to the selected bit rate. The client terminal 10 reproduces the acquired divided files. Examples of the client terminal 10 include a smartphone, a mobile phone, a tablet, a personal computer, and a television with a network connection function, and the like.

The distribution source server 30 is a server apparatus that supports the ABR distribution such as HLS. The distribution source server 30 is an apparatus that transmits data (encrypted data) including multimedia data (for example, video, audio, and the like) in response to the request from the client terminal 10. For example, the distribution source server 30 stores the divided files (TS file) corresponding to a plurality of bit rates for the certain content. Also, the distribution source server 30 stores the playlist files corresponding to each bit rate (the above mentioned two playlist files based on HLS), and distributes them to the client terminal 10.

The data communication apparatus 20 is an apparatus that relays the communication between the client terminal 10 and the distribution source server 30, as well as performs pacing process. As shown in FIG. 4, the data communication apparatus 20 comprises a transmission-reception part 201 and a pacing part 202.

The transmission-reception part 201 is a means for transmitting/receiving data between the client terminal 10 and the distribution source server 30. The transmission-reception part 201 operates as a proxy (proxy server) for the distribution source server 30. That is, the transmission-reception part 201 acts as a server relative to the client terminal 10 and as a client relative to the distribution source server 30. The transmission-reception part 201 performs address conversion for realizing a proxy and communication control (for example, session establishment, data transmission rate change) between the client terminal 10 and the distribution source server 30. The transmission-reception part 201 transmits the received data from the distribution source server 30 to the client terminal 10 according to a data transmission scheme instructed by a data transmission scheme determination part 212 which will be described later.

The pacing part 202 is a means that performs pacing process according to the data transmission/reception status. More concretely, the pacing part 202 determines the data transmission scheme (data transmission is controlled, for example, band limitation while data transmission is performed) by the transmission-reception part 201 to the client terminal 10 based on a result whether or not the data received from the distribution source server 30 is based on the ABR distribution scheme. More concretely, the pacing part 202 applies pacing to the SSL communication between the client terminal 10 and the distribution source server 30 in a case where the received data is determined to be ABR traffic by the ABR determination part 211 which will be described later.

The pacing part 202 is configured by comprising the ABR determination part 211 and the data transmission scheme determination part 212.

The ABR determination part 211 is a means whether or not the data transmission scheme from the distribution source server 30 to the client terminal 10 is based on the ABR distribution scheme.

The data transmission scheme determination part 212 is a means that determines the data transmission scheme upon transmitting the received data from the distribution source server 30 to the client terminal 10 according to a determination result by the ABR determination part 211. Concretely, in a case where the determination result by the ABR determining part 211 is "ABR traffic", the data transmission scheme determination part 212 limits the bandwidth (bandwidth control, transmission speed control upon data transmission) suitable for the ABR transmission scheme, and instructs to the transmission-reception part 201 to transmit the received data from the distribution source server 30 to the client terminal 10. As described above, the data transmission scheme determination part 212 realizes the pacing process suitable for the ABR traffic.

Note that a pacing rate (data transmission speed) used in the case of the ABR traffic is set in advance in the data transmission scheme determination part 212, and it instructs to the transmission-reception part 201 to perform data transmission at that rate. Alternatively, in a case where the data communication apparatus 20 could acquire information on the bit rate (bit rate of the content) selected by the client terminal 10, the data transmission scheme determination part 212 may determine the transmission bit rate of the received data based on the acquired bit rate.

Also, in a case where the determination result by the ABR determining part 211 is "non-ABR traffic", the data transmission scheme determining part 212 does not perform any specific operation (data transmission control).

[Hardware Configuration]

Next, a hardware configuration of the data communication apparatus 20 will be described.

Figure 5:
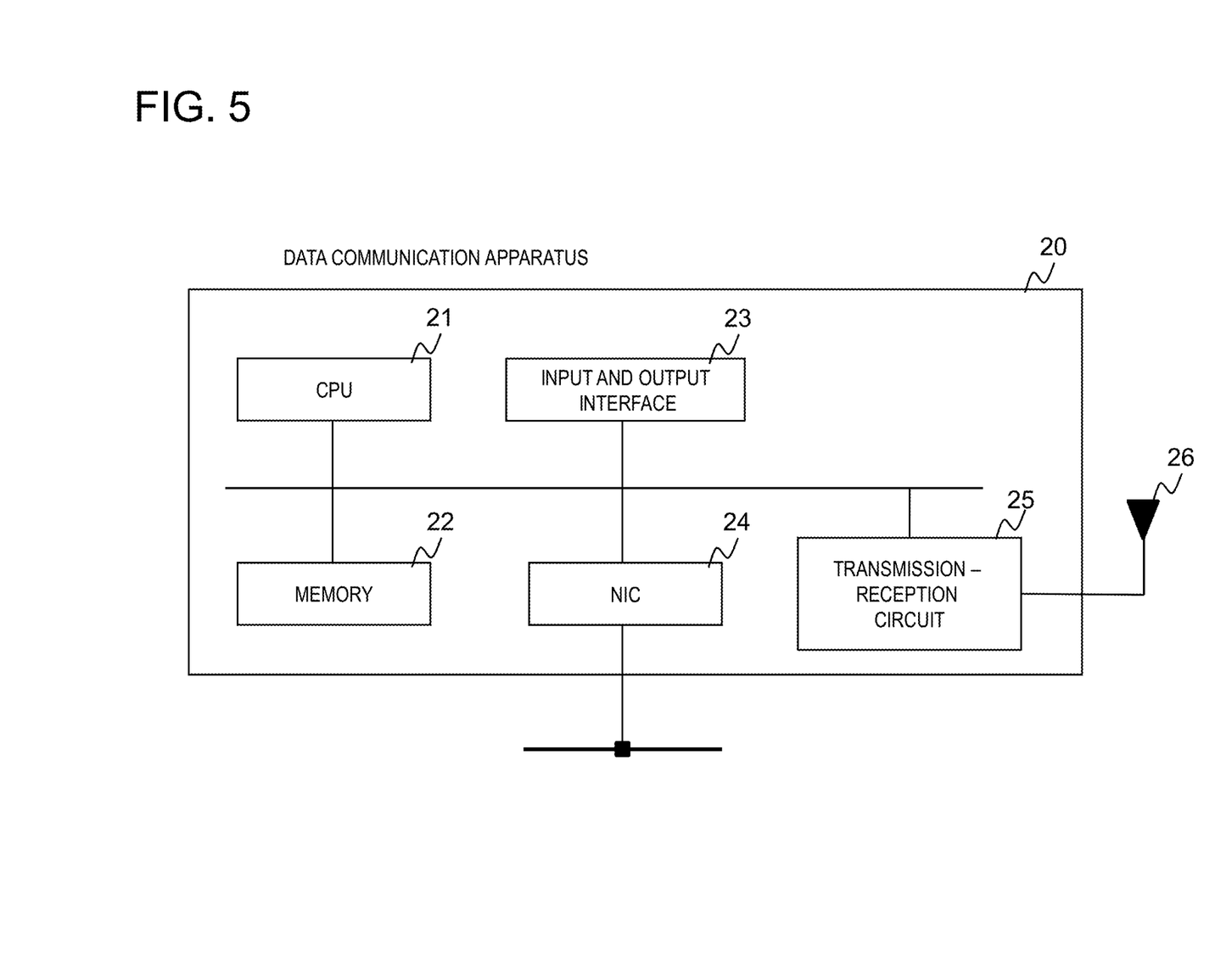
FIG. 5 is a block diagram showing an example of hardware configuration of a data communication apparatus according to the first exemplary embodiment.

FIG. 5 is a block diagram showing an example of the hardware configuration of the data communication apparatus 20 according to the first exemplary embodiment. The data communication apparatus 20 comprises a configuration illustrated in FIG. 5. For example, the data communication apparatus 20 comprises a CPU (Central Processing Unit) 21, a memory 22, an input and output interface 23, a NIC (Network Interface Card) 24 being a communication interface, and a wireless antenna 26 that is connected to transmission-reception circuit 25 and the like, which are mutually connected using internal BUS.

However, the configuration shown in FIG. 5 is not intended to limit the hardware configuration of the data communication apparatus 20. The data communication apparatus 20 may include a hardware (not shown), or may not include the input and output interface 23 and the like as necessary. For example, in a case where input and output of information in the data communication apparatus 20 is performed by an operation terminal connected via the network, the input and output interface 23 may not be necessary. Also, a number of CPUs and the like included in the data communication apparatus 20 is not limited to the example shown in FIG. 5, so that for example, a plurality of CPUs 21 may be included in the data communication apparatus 20.

The configuration shown in FIG. 5 corresponds to a case where the client terminal 10 and the data communication apparatus 20 are wirelessly connected, and the distribution source server 30 and the data communication apparatus 20 are connected by wire. Therefore, in a case where the connection type with the client terminal 10 and the like are different, the configuration shown in FIG. 5 may naturally change. For example, in a case where the client terminal 10 and the data communication apparatus 20 are connected by wire, the transmission-reception circuit 25 is not necessary.

The memory 22 is a random access memory (RAM), a read only memory (ROM), or an auxiliary storage device (such as a hard disk).

The input and output interface 23 is an interface being a display apparatus or an input apparatus (not shown). The display apparatus is, for example, a liquid crystal display and the like. The input apparatus is, for example, an apparatus that receives a user operation such as by a keyboard or a mouse, or an apparatus that inputs information from an external storage device such as a USB (Universal Serial Bus) memory. The user inputs necessary information to the data communication apparatus 20 using the keyboard, the mouse, and the like.

The transmission-reception circuit 25 is a circuit for realizing wireless communication with the client terminal 10, and transmits/receives a wireless signal(s) via the wireless antenna 26.

A function(s) of the data communication apparatus 20 is/are realized by the above-described process modules (the transmission-reception part 201, the pacing part 202, and the like). The process modules are realized, for example, by the CPU 21 executing a program stored in the memory 22. Also, the program can be downloaded via the network or updated using the storage medium storing the program. Further, the process modules may be realized by a semiconductor chip(s). That is, the functions performed by the process modules may be realized by executing software on some hardware.

[Explanation of an Operation(s)]

Figure 6:
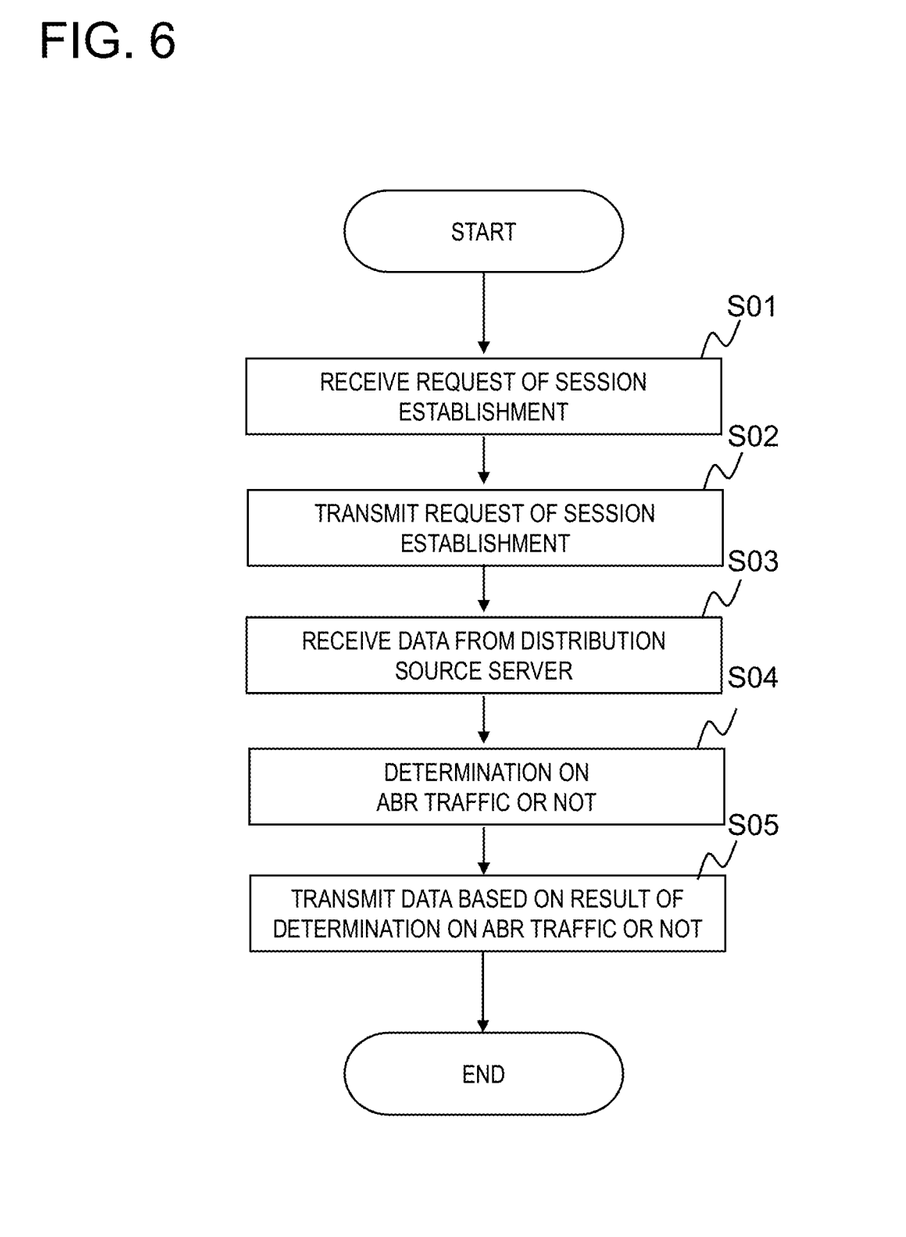
FIG. 6 is a flowchart showing an example of an operation(s) related to the first exemplary embodiment.

FIG. 6 is a flowchart showing an example of an operation(s) of the data communication apparatus 20.

First, the transmission-reception part 201 receives a request of session establishment from the client terminal 10 to the distribution source server 30 (Step S01). More concretely, the transmission-reception reception part 201 receives a connection request by SSL data transmission from the client terminal 10.

The transmission-reception part 201 transmits the request for session establishing to the distribution source server 30 (step S02).

Thereafter, the transmission-reception part 201 receives SSL data from the distribution source server 30, and buffers the received data for a predetermined period (Step S03). After that, the transmission-reception part 201 transmits the buffered received data (received packet) to the ABR determination part 211.

The ABR determination part 211 analyzes the received data and determines whether or not the received data is the ABR traffic (Step S04). That is, the ABR determination part 211 determines whether or not the data transmission scheme from the distribution source server 30 to the client terminal 10 is based on the ABR distribution scheme. After that, the ABR determination part 211 transmits the determination result and the received data from the transmission-reception part 201 to the data transmission scheme determination part 212.

Note that, the determination on whether or not the received data is ABR traffic is made based on the waveform(s) by the sum amount of the received data in the measurement term unit as one delimiter. Details of the determination by the ABR determination part 211 will be described later.

The data transmission scheme determination part 212 instructs to the transmission-reception part 201 to perform data transmission according to the determination result by the ABR determination part 211 (Step S05). Concretely, in a case where the determination result by the ABR determination part 211 is "ABR traffic", the data transmission scheme determination part 212 instructs to the transmission-reception part 201 to perform data transmission suitable for ABR traffic.

On the other hand, in a case where the determination result is "non-ABR traffic", the data transmission scheme determination part 212 does not instruct specific transmission control to the transmission-reception part 201. That is, the data transmission scheme determination part 212 transmits the received data to the transmission-reception part 201 and instructs to the transmission-reception unit 201 only to transmit the data. The transmission-reception part 201 transmits the received data to the client terminal 10 according to the instruction from the data transmission scheme determination part 212.

Next, an explanation will be given of how the ABR determination part 211 determines whether or not ABR traffic.

Figure 7:
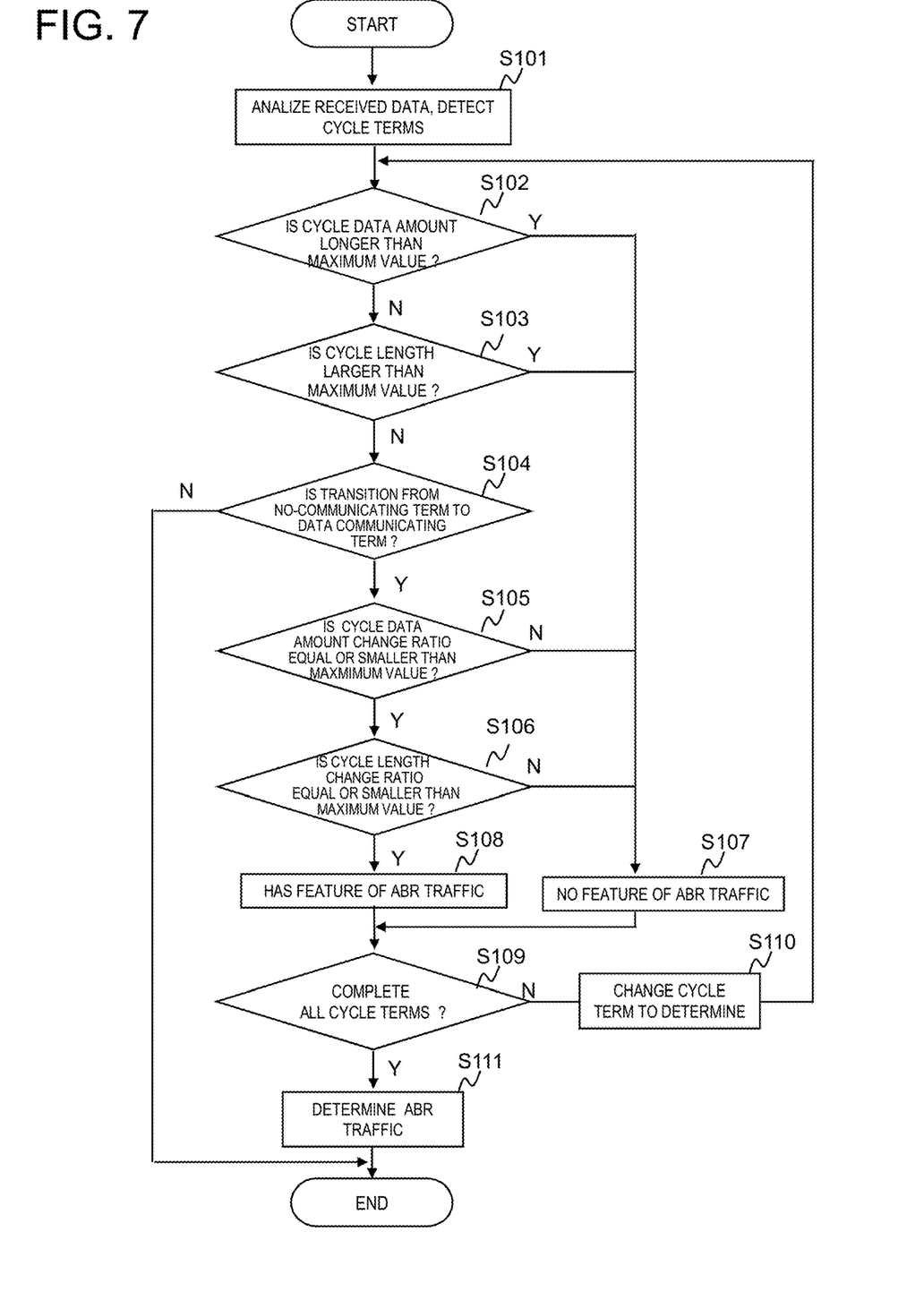
FIG. 7 is a flowchart showing an example of an operation(s) of an ARB determination part.

FIG. 7 is a flowchart showing an example of an operation(s) of the ABR determination part 211.

The ABR determination part 211 detects a cycle term (No. 7 in Table 1 and FIG. 3) that is specific to ABR traffic using the accumulated received data (Step S101). Concretely, the ABR determination part 211 sums up the data amount (received packet) in the measurement term unit (No. 1 in Table 1 and FIG. 3), and calculates a data amount in measurement term unit (No. 3 in Table 1 and FIG. 3). Thereafter, the ABR determination part 211 compares the data amount in the measurement term unit with the minimum data amount in data communicating term (No. 4 in Table 1 and FIG. 3), and determines whether the measurement term unit is a data communicating term (No. 5 in Table 1 and FIG. 3). or a no-communicating term (No. 6 in Table 1 and FIG. 3). Thereafter, the ABR determination part 211 calculates the cycle term (No. 7 in Table 1 and FIG. 3) in which a continuous data communicating term and a continuous no-communicating term are set as one set. The ABR determination part 211 acquires the waveform information as shown in FIG. 3 by repeating the above-described process on the accumulated (buffered) received data.

Next, the ABR determination part 211 determines whether or not a feature of ABR traffic exists in each cycle term by executing the processes from step S102 to S106 for each of the detected cycle term.

In step S102, the ABR determination part 211 determines whether or not the cycle data amount (No. 8 in Table 1) in the cycle term to be determined is larger than a maximum cycle data amount in the cycle term (predetermined threshold). In a case where the cycle data amount is larger than the maximum cycle data amount in cycle term (step S102, Yes branch), the cycle term to be determined is determined as being "no feature of ABR traffic" (step S107). In a case where the cycle data amount in cycle term is equal or smaller than the maximum cycle data amount in cycle term (step S102, No branch), the process of step S103 is executed.

In step S103, the ABR determination part 211 determines whether or not the cycle length of the cycle term to be determined (No.9 in Table 1) is longer than the maximum cycle length. In a case where the cycle length is longer than the maximum cycle length (step S103, Yes branch), the cycle term to be determined is determined as being "no feature of ABR traffic" (step S107). In a case where the cycle length is equal or less than the maximum cycle length (step S103, No branch), the process of step S104 is executed.

In step S104, the ABR determination part 211 determines whether or not a transition from the no-communicating term in the cycle term to be determined to the data communicating term in a next cycle term has occurred. In a case where the transition (change) from the no-communicating term to the communication term has not occurred (step S104, No branch), it means that the no-communicating term continues. Accordingly, since the communication between the client terminal 10 and the distribution source server 30 is not actually performed, the process is terminated. In a case where the transition from the no-communicating term to the data communicating term has occurred (step S104, Yes branch), the process of step S105 is executed.

In step S105, the ABR determination part 211 determines whether or not the cycle data amount change ratio (No. 10 in Table 1) is equal or less than the maximum cycle data amount change ratio. In a case where the cycle data amount change ratio is larger than the maximum cycle data amount change ratio (step S105, No branch), the cycle term to be determined is determined as being "no feature of ABR traffic" (step S107). In a case where the cycle data amount change ratio is equal or less than the maximum cycle data amount change ratio (step S105, Yes branch), the process of step S106 is executed.

For example, in FIG. 3, in a case where the cycle term illustrated as the first cycle is the cycle term to be determined, the cycle data amount change rate between the cycle term and a subsequent cycle term (cycle term illustrated as the second cycle) is calculated. In a case where the change rate is equal to or less than a predetermined threshold value (maximum cycle data amount change rate), the above-mentioned second feature that the received data amount in two subsequent cycle terms are substantially the same is met. In other words, in a case where the cycle data amount change ratio exceeds the maximum amount, it is determined that the feature of the ABR traffic does not appear in the cycle term.

In step S106, the ABR determination part 211 determines whether or not the cycle length change ratio (No. 11 in Table 1) is equal to or less than the maximum cycle length change ratio. In a case where the cycle length change ratio is larger than the maximum cycle length change ratio (step S106, No branch), the cycle term to be determined is determined as being "no feature of ABR traffic" (step S107). In a case where the cycle length change ratio is equal or less than the maximum cycle length change ratio (step S106, Yes branch), the cycle term to be determined is determined to be "has feature of ABR traffic" (step S108).

For example, in FIG. 3, in a case where the cycle term illustrated as the first cycle term is the cycle term to be determined, the cycle length change ratio between the cycle term and a subsequent cycle term (cycle term illustrated as second cycle term) is calculated. In a case where the change rate is equal or less than a predetermined threshold (maximum cycle length change rate), it is determined that the cycle term has the feature of the ABR traffic.

When the determination of the cycle term to be determined is completed, the ABR determination part 211 checks whether or not there are any remaining cycle terms to be determined (step S109). In a case where remains cycle terms to be determined, the ABR determination part 211 changes the cycle term to be determined (step S110), and repeats the processes after step S102. In a case where there are no cycle terms to be determined, the process of step S111 is performed.

In step S111, the ABR determination part 211 determines whether or not the received data is the ABR traffic based on the determination result of each cycle term (has feature of ABR traffic, or no feature of ABR traffic). For example, in a case where a ratio of the cycle terms determined to be "has feature of ABR traffic" is equal or greater than a predetermined value, the received data is determined as being ABR traffic.

As described above, the ABR determination part 211 calculates using the accumulated received data, one term as a data communicating term in which data amount per a predetermined term unit (measurement term unit) is larger than a first threshold (minimum data amount in measurement term unit) continues, another term as a no-communicating term in which data amount in the predetermined term unit is equal or less than the first threshold. Further, the ABR determination part 211 determines one cycle term as from the data communicating term to the no-communicating term, and calculates a plurality of cycle terms using the accumulated received data. Thereafter, the ABR determination part 211 determines whether or not the feature of ABR traffic appears in each of the plurality of cycle terms, and determines whether or not the data transmission from the distribution source server 30 to the client terminal 10 is based on the ABR traffic distribution scheme, according to the determination results of each of the plurality of cycle terms. More concretely, the ABR determination part 211 determines whether or not the feature of ABR traffic appears in the first cycle term based on the first data amount in the data communicating term included in the first cycle term is larger than the second threshold (maximum data amount in cycle term). The ABR determining part 211 determines whether or not the feature of ABR traffic appears in the first cycle term based on the first length in the data communicating term included in the first cycle term is longer than the third threshold (maximum cycle length). The ABR determination part 211 determines whether or not the feature of the ABR traffic appears in the first cycle term based on the change rate between the first data amount and the second data amount for the data communicating term included in the second cycle term is equal to or less than the fourth threshold (maximum cycle data amount change ratio). The ABR determination part 211 determines whether or not the feature of the ABR traffic appears in the first cycle term based on the change rate between the first length and the second length for the data communicating term included in the second cycle term is equal or less than the fifth threshold (maximum cycle length change rate).

Note that the above-described determination of ABR traffic and transmission control according to the determination result are performed on a session basis. That is, the traffic patterns of the ABR traffic are recognized by each session that appears at that time, and the ABR traffic is controlled for each session. As a result, the optimal traffic control is realized for each session established at that time, regardless of the past increase or decrease trends.

As described above, in the data communication apparatus 20 according to the first exemplary embodiment, the waveform analysis of the encrypted received data such as by SSL communication is performed, and determines whether or not the data transmission from the distribution source server 30 is based on the ABR distribution scheme. Further, the data communication apparatus 20 reflects the determination whether or not data distribution scheme is based on the ABR traffic (whether or not the received data is the ABR traffic) to the data transmission control to the client terminal 10. That is, the data communication apparatus 20 performs a communication flow amount control according to feature of ABR traffic in SSL pacing control.

As described above, in the first exemplary embodiment, the communication flow amount control according to the feature of ABR traffic is performed by enabling the determination of ABR traffic at high speed from the received data. As a result, the pacing process according to the feature of ABR traffic can be executed even in a concealed communication, resulting in reducing the communication bandwidth, while preventing decrease of QoE (Quality of Experience) for the user.

Also, in the plurality of flowcharts used in the above description, the plurality of steps (processes) are described in order, but the execution order of the steps executed in each exemplary embodiment is not limited to the described order. In each exemplary embodiment, the order of the illustrated steps can be changed within a range that does not hinder the contents, such as executing each process in parallel. Also, each of the above-described exemplary embodiments can be combined in a range where the contents do not conflict with each other.

Although the industrial applicability of the present invention is clear from the above description, the present invention suitably is applicable to a communication flow amount control scheme for mobile communication (cellular network) by SSL communication between a mobile apparatus and a video distribution service, and the like. Further, instead of the cellular network, the present invention can also be used for communication flow amount control by SSL communication through various access networks such as a wireless or a wired LAN (Local Area Network), and an optical fiber.

MODES

Part or all of the above-mentioned exemplary embodiments can be described as following modes but are not limited to the followings.
<Mode 1>
A data communication apparatus according to the first aspect described above.
<Mode 2>
The data communication apparatus preferably according to mode 1, wherein
the transmission-reception part is configured to accumulate the received data from the server for a predetermined period,
the ABR determination part is configured to:
calculate from the accumulated received data, one term as data communicating term in which the data amount per term unit is larger than a first threshold continues, and another term as a no-communicating term in which the data amount per term unit is equal or smaller than the first threshold continues,
identify a term length from the data communicating term to the no-communicating term, as one cycle term,
calculate a plurality of the cycle terms from the accumulated received data,
determine whether or not each of the plurality of the cycle terms has a feature of ARB traffic, and,
determine whether or not the data transmission from the server to the client terminal is for the ARB distribution scheme, based on a result of the determination of each of plurality of the cycle terms.
<Mode 3>
The data communication apparatus preferably according to mode 2, wherein
the ABR determination part is configured to:
determine whether or not a first cycle term has the feature of ARB traffic, based on a first data amount during the data communicating term in a first cycle term is larger than a second threshold.
<Mode 4>
The data communication apparatus preferably according to mode 3, wherein
the ABR determination part is configured to:
determine whether or not the first cycle term has the feature of ARB traffic, based on a first length during the data communicating term in the first cycle term is longer than a third threshold.
<Mode 5>
The data communication apparatus preferably according to mode 4, wherein
the ABR determination part is configured to:
determine whether or not the first cycle term has the feature of ARB traffic, based on a change ratio between the first data amount and a second data amount during the data communicating term in a second cycle term is equal or less than a fourth threshold.
<Mode 6>
The data communication apparatus preferably according to mode 5, wherein
The ABR determination part is configured to:
determine whether or not the first cycle term has the feature of ARB traffic, based on a change ratio between the first length and a second length for the data communicating term in the second cycle term is equal or less than a fifth threshold.
<Mode 7>
The data communication apparatus preferably according to any one of claims 1 to 6, wherein
a communication between the server and the client terminal is encrypted by SSL (Secure Socket Layer) or TLS (Transport Layer Security).
<Mode 8>
A communication system according to the second aspect described above.
<Mode 9>
A data communication method according to the third aspect described above.
<Mode 10>
A program according to the fourth aspect described above.
Note that modes 8 to 10 are possible to be extended like the way in case of mode 1, which is extended to modes 2 to 7.

Each disclosure of the above-mentioned Patent Literatures and so on that have been cited is incorporated herein in its entirety by reference. Modification and adjustment of each exemplary embodiment or each example are possible within the scope of the overall disclosure (including the claims) of the present invention and based on the basic technical concept of the present invention. Various combinations or selections (including partial deletion) of various disclosed elements (including each element in each claim, each element in each exemplary embodiment or each example, and each element in each drawing) are possible within the scope of the overall disclosure of the present invention. That is, the present invention naturally includes various variations and modifications that could be made by those skilled in the art according to the overall disclosure including the claims and the technical concept. With respect to numerical value range(s) described herein in particular, arbitrary numerical value(s) and a small range(s) included in the numerical value range should be construed to be specifically described even unless otherwise explicitly described.

REFERENCE SIGNS LIST

10 client terminal
20, 100 data communication apparatus
21 CPU
22 memory
23 input and output interface
24 NIC
25 transmission-reception circuit
30 distribution source server
101 transmission-reception part
102, 211 ABR determination part
103 scheme determination part
201 transmission-reception part
202 pacing part
212 data transmission scheme determination part
301 no-communicating term
311, 312 cycle term

The invention claimed is:
1. A data communication apparatus, comprising a hardware processor configured to implement:
a transmission-reception part configured to transmit and receive data between a client terminal and a server, an ABR determination part configured to determine whether or not a data transmission scheme from the server to the client terminal is based on an ABR (Adaptive Bit Rate) distribution scheme according to a change ratio of a data amount between a first cycle term and a second cycle term following the first cycle term, and a change ratio of a cycle length between the first cycle term and the second cycle term following the first cycle term, and, a scheme determination part configured to determine the data transmission scheme upon transmitting a received data from the server to the client terminal according to a result by the ABR determination part, wherein the transmission-reception part is configured to transmit the received data from the server to the client terminal by the data transmission scheme determined by the scheme determination part.

2. The data communication apparatus according to claim 1, wherein the transmission-reception part is configured to accumulate the received data from the server for a predetermined term, and, the ABR determination part is configured to:

calculate from the accumulated received data, one term as a data communicating term in which data amount per term unit is larger than a first threshold continues, and another term as a no-communicating term in which data amount per term unit is equal or smaller than the first threshold continues, respectively, identify a term length from the data communicating term to the no-communicating term, as one cycle term, calculate a plurality of the cycle terms from the accumulated received data, determine whether or not each of the plurality of the cycle terms has a feature of ABR traffic, and, determine whether or not the data transmission from the server to the client terminal is by the ABR distribution scheme, based on a result of the determination of each of the plurality of the cycle terms.

3. The data communication apparatus according to claim 2, wherein the ABR determination part is configured to:

determine whether or not a first cycle term has the feature of ABR traffic, based on a first data amount during the data communicating term in a first cycle term is larger than a second threshold.

4. The data communication apparatus according to claim 3, wherein the ABR determination part is configured to:

determine whether or not the first cycle term has the feature of ABR traffic, based on a first length during the data communicating term in the first cycle term is longer than a third threshold.

5. The data communication apparatus according to claim 4, wherein the ABR determination part is configured to:

determine whether or not the first cycle term has the feature of ABR traffic, based on a change ratio between the first data amount and a second data amount during the data communicating term in a second cycle term is equal or less than a fourth threshold.

6. The data communication apparatus according to claim 5, wherein the ABR determination part is configured to:

determine whether or not the first cycle term has the feature of ABR traffic, based on a change ratio between the first length and a second length during the data communicating term in the second cycle term is equal or less than a fifth threshold.

7. The data communication apparatus according to claim 1, wherein a communication between the server and the client terminal is encrypted by SSL (Secure Socket Layer) or TLS (Transport Layer Security).

8. A communication system, comprising:

a client terminal, a server, a data communication apparatus comprising a hardware processor configured to relay data between the client terminal and the server, wherein the data communication apparatus is formulated according to claim 1.

9. A data communication method for a data communication apparatus that comprises a transmission-reception part which transmits and receives data between a client terminal and a server, comprising:

ABR determining whether or not a data transmission from the server to the client terminal is based on an ABR (Adaptive Bit Rate) distribution scheme according to a change ratio of a data amount between a first cycle term and a second cycle term following the first cycle term, and a change ratio of a cycle length between the first cycle term and the second cycle term following the first cycle term, transmission scheme determining a data transmission scheme upon transmitting a received data from the server to the client terminal according to a result of the ABR determining, and, transmitting the received data from the server to the client terminal by the data transmission scheme determined by the transmission scheme determining.

10. A computer readable non-transient recording medium storing a program executed by a computer installed to a data communication apparatus that comprises a transmission-reception part which transmits and receives data between a client terminal and a server, causing the computer to perform processings of:

ABR determining whether or not a data transmission from the server to the client terminal is based on ABR (Adaptive Bit Rate) distribution scheme according to a change ratio of a data amount between a first cycle term and a second cycle term following the first cycle term, and a change ratio of a cycle length between the first cycle term and the second cycle term following the first cycle term, transmission scheme determining the data transmission scheme upon transmitting a received data from the server to the client terminal according to a result of the process of ABR determining, transmitting the received data from the server to the client terminal by the data transmission scheme determined by the process of scheme determining.

11. The communication system according to claim 8, wherein the transmission-reception part is configured to accumulate the received data from the server for a predetermined term, and, the ABR determination part is configured to:

calculate from the accumulated received data, one term as a data communicating term in which data amount per term unit is larger than a first threshold continues, and another term as a no-communicating term in which data amount per term unit is equal or smaller than the first threshold continues, respectively, identify a term length from the data communicating term to the no-communicating term, as one cycle term, calculate a plurality of the cycle terms from the accumulated received data, determine whether or not each of the plurality of the cycle terms has a feature of ABR traffic, and, determine whether or not the data transmission from the server to the client terminal is by the ABR distribution scheme, based on a result of the determination of each of the plurality of the cycle terms.

12. The communication system according to claim 11, wherein
the ABR determination part is configured to:
determine whether or not a first cycle term has the feature of ABR traffic, based on a first data amount during the data communicating term in a first cycle term is larger than a second threshold.

13. The communication system according to claim 12, wherein
the ABR determination part is configured to:
determine whether or not the first cycle term has the feature of ABR traffic, based on a first length during the data communicating term in the first cycle term is longer than a third threshold.

14. The communication system according to claim 13, wherein
the ABR determination part is configured to:
determine whether or not the first cycle term has the feature of ABR traffic, based on a change ratio between the first data amount and a second data amount during the data communicating term in a second cycle term is equal or less than a fourth threshold.

15. The communication system according to claim 14, wherein
the ABR determination part is configured to:
determine whether or not the first cycle term has the feature of ABR traffic, based on a change ratio between the first length and a second length during the data communicating term in the second cycle term is equal or less than a fifth threshold.

16. The communication system according to claim 8, wherein
a communication between the server and the client terminal is encrypted by SSL (Secure Socket Layer) or TLS (Transport Layer Security).

17. The data communication method according to claim 9, wherein
the transmission-reception part is configured to accumulate the received data from the server for a predetermined term, and,
ABR determining part is configured to:
calculate from the accumulated received data, one term as a data communicating term in which data amount per term unit is larger than a first threshold continues, and another term as a no-communicating term in which data amount per term unit is equal or smaller than the first threshold continues, respectively,
identify a term length from the data communicating term to the no-communicating term, as one cycle term,
calculate a plurality of the cycle terms from the accumulated received data,
determine whether or not each of the plurality of the cycle terms has a feature of ABR traffic, and,
determine whether or not the data transmission from the server to the client terminal is by the ABR distribution scheme, based on a result of the determination of each of the plurality of the cycle terms.

18. The data communication method according to claim 17, wherein
ABR determining is configured to:
determine whether or not a first cycle term has the feature of ABR traffic, based on a first data amount during the data communicating term in a first cycle term is larger than a second threshold.

19. The data communication method according to claim 18, wherein
the ABR determining is configured to:
determine whether or not the first cycle term has the feature of ABR traffic, based on a change ratio between the first data amount and a second data amount during the data communicating term in a second cycle term is equal or less than a fourth threshold.

20. The data communication method according to claim 19, wherein
the ARB determination part ABR determining is configured to:
determine whether or not the first cycle term has the feature of ABR traffic, based on a change ratio between the first length and a second length during the data communicating term in the second cycle term is equal or less than a fifth threshold.

* * * * *